Nov. 4, 1952 V. J. WATTENBERGER 2,616,539
BI-DIRECTIONAL MAGNETIC FLUID CLUTCH
Filed Dec. 30, 1949
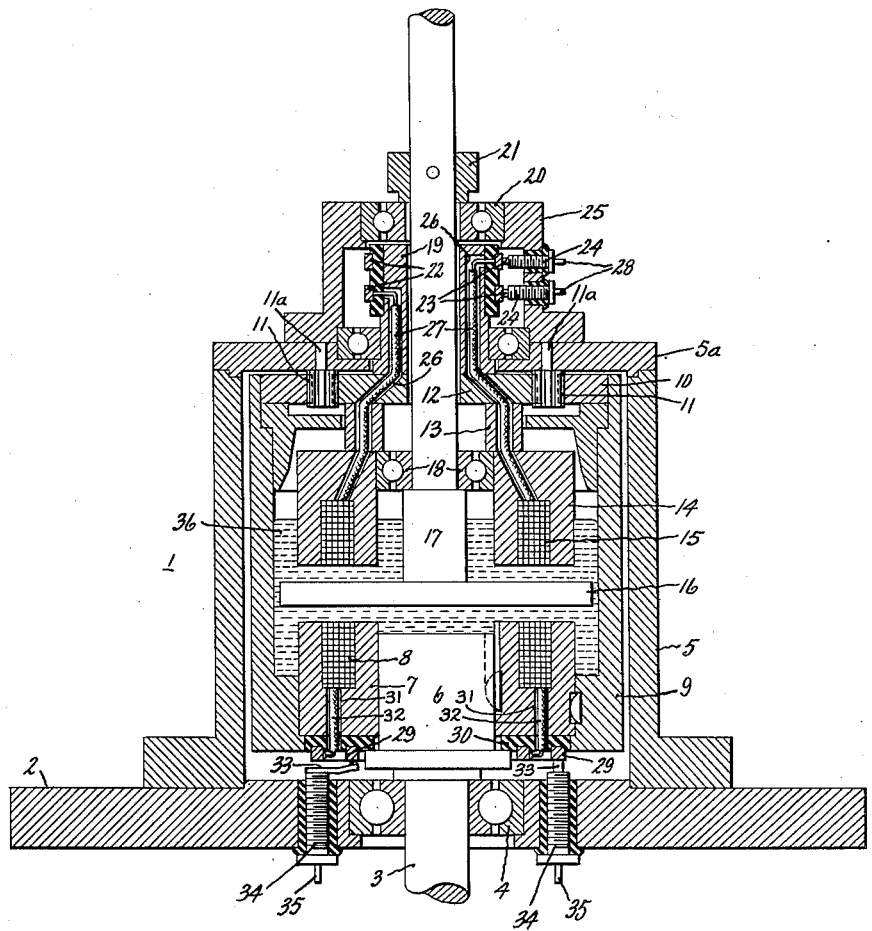
Inventor:
Vernon J. Wattenberger,
by Paul A. Frank
His Attorney.

UNITED STATES PATENT OFFICE 2,616,539

BI-DIRECTIONAL MAGNETIC FLUID CLUTCH

Vernon J. Wattenberger, Schenectady, N. Y., assignor to General Electric Company, a corporation of New York Application December 30, 1949, Serial No. 135,955

1 Claim. (Cl. 192—21.5)

This invention relates to fluid clutches and, in particular, to a magnetic type of fluid clutch in which the torque or speed in the output shaft can be made to go from a maximum value in one direction through zero to a maximum value in the opposite direction while the input shaft unidirectionally rotates at a uniform speed.

More specifically, this invention is a clutch comprising a planetary gear system and a liquid containing a suspended ferrous material.

Magnetic fluid clutches are becoming ever more important in the mechanical art, since it is possible by varying a field current of a small value to regulate the speed and torque of an output shaft producing many times more power than that used to control it.

The extent of the use of magnetic fluid clutches is so vast that it is difficult at this time to define the scope of their use.

It is an object of this invention to provide an improved fluid magnetic clutch.

It is a still further object of this invention to provide a fluid magnetic clutch having a unidirectional input shaft and a bi-directional output shaft, the torque and speed of which can be changed from a maximum in one direction through zero to a maximum in the other direction.

Broadly, this invention comprises a fluid magnetic clutch having two magnetic coils, one being positioned on either side of a flat metallic plate connected to the output shaft. By varying the current in these magnetic coils, the direction and torque of the output shaft is controlled.

These and other objects and advantages of this invention will become apparent and the invention will be more clearly understood from the following description referring to the accompanying drawing and the features of novelty which characterize this invention will be pointed out with particularity in the claim annexed to and forming a part of this specification.

In the drawing, the single figure is a front view, partly in section, of the improved magnetic fluid clutch.

In the drawing, a magnetic fluid clutch 1 is shown mounted on a base plate 2. An input shaft 3, connected to some source of power (not shown), extends through a bearing 4 into a housing 5 for magnetic clutch 1. End 6 of shaft 3 is adapted to support a coil case 7 in which a coil 8 is located. Coil 8 comprises a plurality of turns of an insulated conductor which produces a magnetic field when energized. Coil case 7 is secured to end 6 of shaft 3 by some means such as a key.

A sleeve 9 surrounds coil case 7 and is secured thereto. Sleeve 9 extends axially from base plate 2 to a ring gear 10 which is secured to its opposite end.

A plurality of spider gears 11 are rotatable about shafts 11a which are fixed in cover 5a of housing 5. A sun gear 12 is in engagement with spider gears 11, while the spider gears, in turn, are in engagement with ring gear 10. Consequently, as ring gear 10 turns in one direction, sun gear 12 turns in the opposite direction. Sun gear 12 is secured to a spacer 13 which, in turn, is secured to a second coil case 14 in which a coil 15 is located. Coil 15 is similar to coil 8.

A circular plate 16, having an external diameter slightly larger than that of the coil cases 7 and 14, is suspended substantially midway between the two coil cases. Plate 16, in turn, is secured to an output shaft 17 which is rotatable within a bearing 18 and a bushing 19. Bushing 19 is secured to sun gear 12; consequently, the combination of bushing 19, sun gear 12, spacer 13, and coil case 14 is revolvable as a unit about output shaft 17. A bearing 20 guides the upper end of output shaft 17, while collar 21 acts as a seal for the shaft and as a thrust bearing to properly locate plate 16 between the two coil cases.

A pair of slip rings 22 are secured to bushing 19. The slip rings are in engagement with brushes 23, which are secured by brush holders 24 contained in a collar 25 secured to cover 5a.

A pair of channels 26 are drilled or otherwise formed through the combination of bushing 19, ring gear 12, spacer 13, and coil housing 14 to accommodate conductors 27 that connect slip rings 22 with coil 15.

With this arrangement, current can be sent from external conductors 28 through the brushes 23 and slip rings 22 to coil 15.

A second set of slip rings 29 are secured to a collar 30 that is fastened to and rotates with coil case 7. Channels 31 carry conductors 32 that connect slip rings 29 with coil 8. A pair of brushes 33 are secured by brush holders 34 which are contained in base plate 2.

This second arrangement provides a current path from external conductors 35 to coil 8.

The combination of sleeve 9, coil case 7, and end 6 of shaft 3 provides a well for a quantity of oil 36 in which there is suspended ferrous material (not shown). The level of the oil mixture is maintained to a point somewhere along the sides of coil case 14. The level of the oil is not important to this invention, so long as there is no air gap between either coil case 14 or coil case 7 and plate 16.

The operating theory of this invention is assumed to be that magnetic flux lines produced by either coil pass through the oil iron mixture separating that coil from plate 16. The magnetic flux, while it passes through the oil mixture between the energized coil and plate 16, has no effect on the oil mixture between the opposite coil and plate 16, since plate 16 provides a flux path back to the coil case around the energized coil and prevents magnetic flux from completely passing through the plate.

With this operating theory, if coil 8 is energized, it sets up magnetic lines of force which flow through coil case 7 and the oil iron mixture to plate 16 and then back again to the coil case. The magnetic lines of force passing through the iron oil mixture align the iron particles which, by analogy, causes the oil mixture to freeze; that is, substantially there is a solid between coil case 7 and plate 16 instead of the fluid that existed before a current was set up in coil 8.

The torque output and speed of output shaft 17 is directly proportional to the amount of current set up in coil 8, while the amount of slip between output shaft 17 and input shaft 1 is inversely proportional to the amount of current set up in coil 8. This condition exists until the saturation current is set up in coil 8. The saturation current of coil 8 limits the minimum slip and the maximum torque of the output shaft and naturally any further increase in current in coil 8 will not produce any increase in torque or decrease in slip in the output shaft.

In accordance with the previous description, sun gear 12 and, consequently, coil case 14, rotate in a direction opposite to that of input shaft 3 and coil case 7. If coil 8 is de-energized and current supplied to coil 15, flux lines are set up in coil case 14 that pass through the oil iron mixture on top of plate 16, then through plate 16 and back through the oil iron mixture to coil case 14 again. Once again, magnetic lines of force align the oil iron mixture, but this time the mixture on top of plate 16 freezes and the plate is caused to rotate in the same direction as coil case 14. If both coils are simultaneously energized, however, the output torque is a function of the difference between the two exciting currents and the direction of the output shaft is determined by the maximum current.

It is interesting to note that if coil 8 is energized while input shaft 3 is rotating, a very high polish is imposed upon the bottom surface of plate 16. Because of this, it is assumed that a frictional drive exists between the frozen fluid and plate 16.

Modifications of this invention will occur to those skilled in the art and it is desired to be understood, therefore, that this invention is not to be limited to the particular arrangement disclosed, but that the appended claim is meant to cover all modifications which are within the spirit and scope of this invention.

What I claim as new and desire to secure by Letters Patent of the United States is:

In a magnetic fluid clutch having a unidirectional input shaft and a bi-directional output shaft axially aligned therewith, a cup shaped member secured at its base to the end of said input shaft, a first coil supported by and rotatable with said input shaft and cup, means including brushes and slip rings for energizing said first coil, a second coil axially displaced from said first coil within said cup, means for supporting said second coil for rotation about said output shaft, means including brushes and slip rings for energizing said second coil, means including a reversing gear system mechanically interconnecting the cup on said input shaft and said supporting means for said second coil and responsive to rotation of said input shaft for revolving said second coil and support in a direction opposite to that of said input shaft and cup, a metal driven plate rigidly secured to the end of said output shaft and axially interpositioned in said cup between said two coils, a magnetic liquid substantially filling the spaces between each of said coils and said driven plate within the cup, and means for electrically energizing either or both of said coils while said input shaft is rotating whereby said magnetic fluid is solidified and said output shaft is rotated in the same direction as the coil supplying the higher flux density, the output torque being a function of the difference between the exciting currents in the two coils.

VERNON J. WATTENBERGER.

REFERENCES CITED

The following references are of record in the file of this patent:

UNITED STATES PATENTS

| Number | Name | Date |
| --- | --- | --- |
| 1,781,192 | Procunier | Nov. 11, 1930 |
| 1,796,352 | Watson | Mar. 17, 1931 |
| 1,866,675 | Sarazin | July 12, 1932 |
| 2,453,957 | Allen | Nov. 16, 1948 |
| 2,524,150 | Vincent | Oct. 3, 1950 |

OTHER REFERENCES

Bureau of Standards publication, Technical Report 1213, Characteristics of Some Magnetic-Fluid Clutch Servomechanisms.